(12) United States Patent
Kim et al.

(10) Patent No.: US 7,961,372 B2
(45) Date of Patent: Jun. 14, 2011

(54) PHOTOCHROMIC FILMS AND METHOD FOR MANUFACTURING THE SAME

(75) Inventors: Woo-Sung Kim, Daejeon Metropolitan (KR); Hyeon Choi, Daejeon Metropolitan (KR); Jee-Seon Kim, Seoul (KR); Dong-Joo Kwon, Daejeon Metropolitan (KR); Young-Jun Hong, Daejeon Metropolitan (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 12/733,283

(22) PCT Filed: Aug. 21, 2008

(86) PCT No.: PCT/KR2008/004876
§ 371 (c)(1),
(2), (4) Date: Feb. 22, 2010

(87) PCT Pub. No.: WO2009/028833
PCT Pub. Date: Mar. 5, 2009

(65) Prior Publication Data
US 2010/0157407 A1 Jun. 24, 2010

(30) Foreign Application Priority Data
Aug. 24, 2007 (KR) .................. 10-2007-0085336

(51) Int. Cl.
*G02F 1/03* (2006.01)
*G02F 1/00* (2006.01)

(52) U.S. Cl. ........................................ 359/241; 359/237
(58) Field of Classification Search ................... 359/241, 359/237, 242, 244–245, 270–273, 485, 488–489, 359/493; 351/41, 44, 49, 163; 349/33
See application file for complete search history.

(56) References Cited

U.S. PATENT DOCUMENTS

| 5,066,818 A | 11/1991 | Gemert et al. |
| 2005/0283234 A1* | 12/2005 | Zhou et al. ............... 623/6.6 |
| 2006/0096528 A1* | 5/2006 | Kawatake et al. ......... 118/407 |
| 2007/0052922 A1 | 3/2007 | King et al. |

FOREIGN PATENT DOCUMENTS

| KR | 10-2003-0089544 A | 11/2003 |
| KR | 10-2005-0042025 A | 5/2005 |
| KR | 10-2007-0027292 A | 3/2007 |
| KR | 10-2007-0099122 A | 10/2007 |
| WO | WO 2006/110219 A1 | 10/2006 |

* cited by examiner

Primary Examiner — Dawayne A Pinkney
(74) Attorney, Agent, or Firm — McKenna Long & Aldridge LLP

(57) ABSTRACT

The present invention provides a photochromic film which is formed by curing a photochromic composition and includes a multifunctional (metha)acrylate-based monomer that has two or more functional groups, and a photochromic dye, a product including the same, and a method for producing the photochromic film.

19 Claims, 2 Drawing Sheets

[Fig. 1]
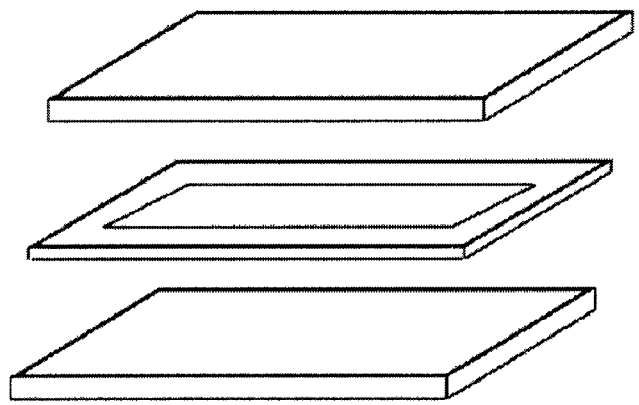
[Fig. 2]
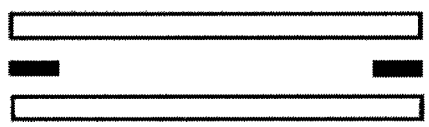
[Fig. 3]
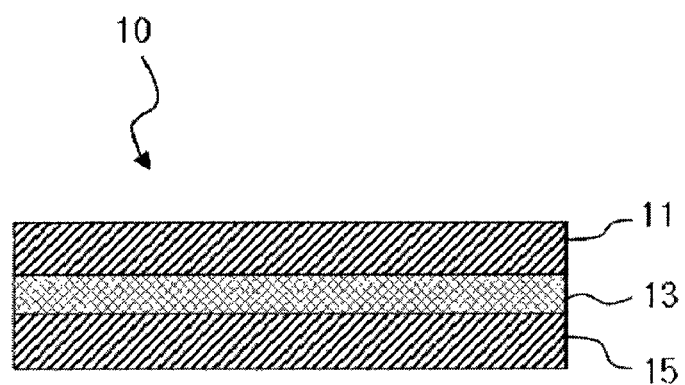

[Fig. 4]
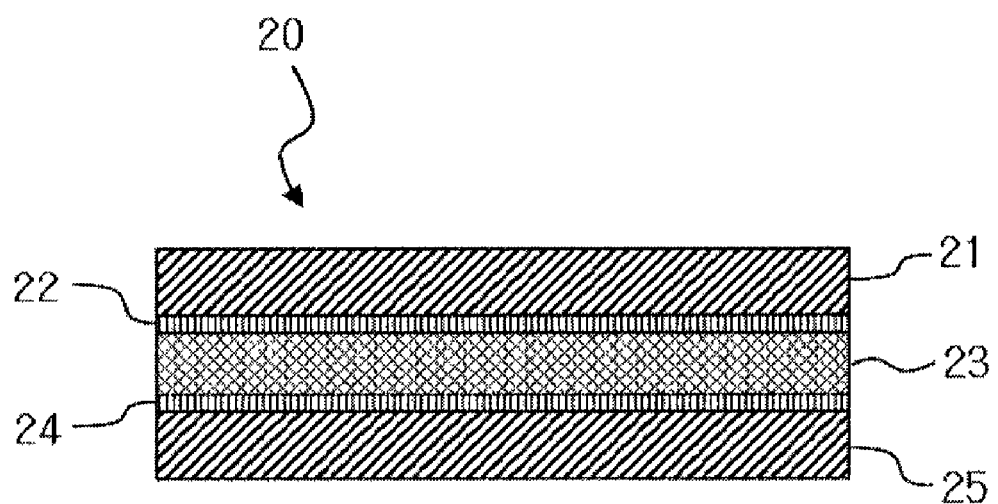

PHOTOCHROMIC FILMS AND METHOD FOR MANUFACTURING THE SAME

This application claims the benefit of PCT/KR2008/004876 filed on Aug. 21, 2008, and Korean Patent Application No. 10-2007-0085336 filed on Aug. 24, 2007, both of which are hereby incorporated herein by reference for all purposes in their entirety.

TECHNICAL FIELD

The present invention relates to a photochromic film and a method for producing the same. More particularly, the present invention relates to a photochromic film that has excellent transparent property and durability property, a small thickness deviation, small defects on a surface of a film, and a relatively large density, and a method for producing the same. This application claims priority from Korean Patent Application No. 10-2007-0085336 filed on Aug. 24, 2007 in the KIPO, the disclosure of which is incorporated herein by reference in its entirety.

BACKGROUND ART

In general, a method for coating a colored film on light-transmissive goods that directly receive a direct ray of light over a long period of time, such as glasses for vehicles or buildings, or a method for using glass, on a surface of which metal components are vacuum deposited, are used in order to block a portion of light. However, according to these methods, since a constant portion of visible rays are always blocked regardless of the light amount, there is a disadvantage in that a field of vision is hindered at night or cloudy weather.

In the related art, there were some products that are called a photochromic film. However, most of them are films that are obtained by masterbatching resins such as polyethylene, polypropylene, polystyrene, ABS and the like and extrusion molding them. Since these films mostly have the poor transparent property, they are used in fields that do not require a predetermined transparent property such as films for agriculture, and cannot be used as a photochromic film for vehicles that require an excellent field of vision.

In Korean Unexamined Patent Application Publication No. 2003-0089544, an effort in which a polyester (PET) film is used as a basic film, a photochromic acryl-based adhesive is coated on the film in an appropriate thickness to produce a photochromic film, and the photochromic film is used as a film for vehicle's suntan film is disclosed, but in this case, there is a problem in that since the durability property of the photochromic film is poor, the film is easily damaged.

Meanwhile, among methods for producing films including the photochromic film, a casting method, as shown in FIGS. 1 and 2, is carried out by inserting a soft or hard gasket between two cell casting plates made of glass and the like in order to control the thickness of the film, sealing it, filling it with a polymerizable raw material, curing it in a constant temperature water bath or oven, and separating the film.

There is no problem in production of the film that has the thickness more than 1 mm by using the above casting method, but when the thin film that has the thickness of not more than 1 mm is produced, there are problems in that the film is deformed, for example, wrinkles are formed on the film during the curing or defects are formed on the surface of the film. In particular, in comparison with the case of when a polymer as a material for forming a film is dissolved in a solvent and then used, in the case of when the monomer is directly injected into a mold and cast, since the film is shrunken while being polymerized and cured, it is very difficult to accomplish the uniformity of the thickness. However, in comparison with the case of when the polymer is used, in the case of when the film is molded by using the monomer, there is an advantage in that the density of film is increased. Accordingly, there is a need to develop a technology for producing a film that has a thickness of not more than 1 mm by using monomers without the above problems.

DISCLOSURE

Technical Problem

It is an object of the present invention to provide a photochromic film that has excellent transparent property and durability property, a small thickness deviation, small defects on a surface of a film, and a relatively large density, so that it is capable of being applied to vehicles or glass for buildings, and products including the same.

It is another object of the present invention to provide a method for producing a photochromic film that has a small thickness deviation, and small defects on a surface of a film in the case of when the photochromic film is produced in a thickness of not more than 1 mm.

Technical Solution

In order to accomplish the above objects, the present invention provides a photochromic film which is formed by curing a photochromic composition and includes a multifunctional (metha)acrylate-based monomer that has two or more functional groups, and a photochromic dye.

In addition, the present invention provides a transparent product which includes a transparent substrate, and the photochromic film on at least one side of the transparent substrate.

In addition, the present invention provides a method for producing a photochromic film, which includes the steps of injecting a photochromic composition into a space that is formed from a pair of substrates and a gasket positioned between the pair of substrates, and curing the composition. The shrinkage ratio of the gasket after the composition is subjected to the curing step is not less than 10%.

In addition, the present invention provides a method for producing the photochromic film, which includes the steps of injecting a photochromic composition into a space that is formed from a pair of substrates and a gasket positioned between the pair of substrates, and curing the composition. The shrinkage ratio of the gasket after the composition is subjected to the curing step is the same as or larger than the shrinkage ratio of the photochromic composition.

Advantageous Effects

A photochromic film according to the present invention has excellent transparency and durability, a small thickness deviation, small defects on a surface of a film, and a relatively large density. In addition, a method for producing a photochromic film according to the present invention may provide a film that has a small thickness deviation and small defects on a surface of a film in the case of when the photochromic film is produced in a thickness of not more than 1 mm.

DESCRIPTION OF DRAWINGS

FIG. 1 is an exploded perspective view that illustrates the arrangement order of two substrates and a gasket that is positioned between two substrates in order to cast a photochromic film;

FIG. 2 is a cross sectional view that illustrates the layering state of two substrates and a gasket that is positioned between two substrates in order to cast a photochromic film;

FIG. 3 is a sectional view that illustrates an example of products including the photochromic film according to the present invention; and FIG. 4 is a sectional view that illustrates an example of products including the photochromic film according to the present invention and an adhesive layer.

BEST MODE

Hereinafter, the present invention will be described in detail.

A photochromic film according to the present invention is characterized in that the film is formed by curing a photochromic composition including a multifunctional (metha)acrylate-based monomer that has two or more functional groups and a photochromic dye. In the present specification, it is understood that (metha)acrylate includes all acrylate and methacrylate.

Since the photochromic film according to the present invention, as described above, is formed from the photochromic composition that includes the multifunctional (metha)acrylate-based monomer that has two or more functional groups in conjunction with a photochromic dye, the oxygen permeation is low, thus the durability property is excellent. In detail, in the photochromic film, as the photochromic dye, a spiro-oxazine or a naphtopyran-based organic compound is used. These dyes are colored by ring opening by UV light irradiation, and if the UV light irradiation is stopped, ring closing occurs, thus it is decolored. In the ring opening state showing the color, the photochromic dye is subjected to photo-oxidation by a peroxi radical formed by oxygen and starts to be decomposed. Accordingly, the reduction of the oxygen transmittance of the photochromic film plays an important role in improving the durability property of the film. In the present invention, as the component of the photochromic composition, the multifunctional (metha)acrylate-based monomer that has two or more functional groups is used, and this monomer provides a free volume that is capable of causing a structural change of the photochromic dye and a structure in which the oxygen permeation is low. The oxygen permeation of the photochromic film according to the present invention is not more than 300 cc/m²·day·atm, and more preferably not more than 100 cc/m²·day·atm. In addition, the photochromic film according to the present invention has the excellent transparent property, and while it is discolored, the optical density (transmittance at λmin) is not more than 35%, and more preferably not more than 20%.

In addition, in the present invention, since a material for forming the photochromic film is not a polymer but a monomer, the film may be formed without using a solvent. Thus, in comparison with the case of when the film is formed by adding the solvent to the polymer, the occurrence of matrix pore that may be formed in a film forming process may be reduced. Accordingly, the density of the photochromic film according to the present invention is relatively large.

In addition, in the case of when the photochromic film according to the present invention is produced by using a method for producing the photochromic film according to the present invention as described later, even if it is produced in a thickness of not more than 1 mm, the thickness deviation may be within 30%, preferably within 10%, and more preferably within 5%.

In addition, in the photochromic film according to the present invention, a time that is required to increase the transmittance at $\lambda_{min}$ (a wavelength value at which the transmittance is smallest) as the index of weather resistance to a half of the transmittance at an early discoloration step is not less than 1,000 hours, and preferably 1,500 to 2,000 hours. In order to measure the time that is required to increase the transmittance at $\lambda_{min}$ to a half of the transmittance at an early discoloration step, the sample is exposed in ATLAS UV 2000, an accelerated weathering tester, by using a UVA lamp under a condition of light intensity of 0.77 W/m² at 340 nm and 60° C. for 8 hours during a cycle in which 4 hour condensation is repeated at 50° C., and a method for measuring an optical density may be used (ASTM G 154-99).

In the present invention, as the multifunctional (metha)acrylate-based monomer that has two or more functional groups, a bisphenol A-based acrylate monomer; a polyalkylene glycol-based di(metha)acrylate and other multifunctional acrylate monomers may be used. They may be used alone or as a mixture thereof. In the present invention, the multifunctional (metha)acrylate-based monomer that has two or more functional groups may be included in an amount of not less than 50% by weight, preferably not less than 70% by weight, and more preferably not less than 80% by weight on the basis of the photochromic composition for forming the photochromic film according to the present invention.

As the bisphenol A-based acrylate monomer, it is preferable that di(metha)acrylate is used, and in detail, there are BP4PA (Diacrylate of propylene oxide modified bisphenol A, KYOEISHA Chemical Co. Ltd.) and the like.

As the polyalkylene glycol-based di(metha)acrylate, for example, bisphenol A ethoxylated di(metha)acrylate that includes an ethoxy group of 2 to 20 repeating units, bisphenol A propoxylated di(metha)acrylate that includes a propoxy group of 2 to 20 repeating units, bisphenol A alkoxylated di(metha)acrylate that includes an epoxy group and a propoxy group of 2 to 20 repeating units, bisphenol A glycerolated dimethacrylate, bisphenol A glycerollate (1 glycerol/phenol) dimethacrylate, or a mixture thereof may be used.

In addition, as the multifunctional acrylate monomer, dipentaerythritol hexaacrylate (DPHA, dipentaerythritol hexa acrylate), dipentaerythritol hydroxy pentaacrylate, pentaerythritol tetraacrylate, pentaerythritol triacrylate, trimethylene propyl triacrylate (TMPTA), propoxylated glycerol triacrylate, trimethylpropane ethoxy triacrylate, or a mixture thereof may be used.

In more detail, as the multifunctional (metha)acrylate-based monomer that has two or more functional groups, it is preferable that BP4PA, EGDA (ethylene glycol diacrylate), EGDMA (ethylene glycol dimethacrylate), DPHA (dipentaerythritol hexaacrylate), and TMPTA (trimethylene propyltriacrylate) are used, and in particular, it is preferable that a mixture of BP4PA, EGDA (ethylene glycol diacrylate) and EGDMA (ethylene glycol dimethacrylate) is used.

In the present invention, to the photochromic composition, a vinyl-based monomer that includes an aromatic ring may be further added, for example, styrene, divinyl benzene and the like may be added. The vinyl-based monomer that includes the aromatic ring may function to dissolve the photochromic dye. In the present invention, in the case of when the vinyl-based monomer that includes the aromatic ring is used, it is preferable that the vinyl-based monomer is included in an amount of not more than 30% by weight on the basis of the photochromic composition for forming the photochromic film according to the present invention.

In the present invention, in the case of when divinyl benzene and EGDMA (ethylene glycol dimethacrylate) having short chains are used, appropriate crosslinking and structures may be obtained while the film is formed by controlling the amounts of the components. Therefore, since the film may provide a structure in which the oxygen transmittance is low, the durability of the photochromic film may be improved.

In the photochromic composition for forming the photochromic film according to the present invention, the long chain monomer that is positioned between the double bonds of the functional groups and has not less than 15 C—C bonds is included in the amount of not less than 50% by weight, preferably not less than 70% by weight, and more preferably not less than 80% by weight on the basis of whole monomers. As the long chain monomer, there are BP4PA, 9-EGDA and the like. In addition, it is preferable that in the photochromic composition for forming the photochromic film according to the present invention, the short chain monomer that is positioned between the double bonds of the functional groups and has less than 15 C—C bonds is included in the amount of less than 50% by weight on the basis of whole monomers. As the short chain monomer, there are EGDMA, DVB, hexaacrylate, pentaacrylate, triacrylate and the like.

In the present invention, as the photochromic dye, anything that is known in the art may be used. For example, spiropyran based, fulgide based, fulgimide based, azo-benzene based, viologen based, spiro-oxazine based, or opyran based organic compounds may be used. In the present specification, a predetermined chemical structure-based compound is a compound that includes the chemical structure as a core structure, and includes a compound including only the chemical structure and a derivative thereof. In the present invention, it is more preferable that the spiro-oxazine based or naphthopyran based compound is used. The photochromic dye may be used in the amount of 0.01 wt %~5 wt %, and preferably 0.1 wt %~3 wt %.

To the photochromic composition for forming the photochromic film according to the present invention, an additive that is known in the art may be added within a range in which physical properties for the final purpose are not obstructed. For example, a polymerization initiator, a stabilizer, a UV absorbing agent, an antioxidant, a chain transfer agent, an IR absorbing agent, an antifoaming agent, an antistatic agent, a release agent and the like may be added thereto. Each of these additives may be added in an amount of 0.01% by weight~5% by weight.

In detail, in order to polymerize the monomers, an azo-based polymerization initiator such as 2,2'-azobis isobutyronitrile, 2,2'-(2,4-dimethyl isovaleronitril), 2,2'-azobis(4-methoxy-2,4-dimethyl valeronitrile), 1,1'-azobis (cyclohexane-1-carbonitrile) and the like, or a peroxide-based polymerization initiator such as lauroyl peroxide, methyl ethyl keton peroxide, diisopropyl peroxy dicarbonate, dicyclohexane peroxydicarbonate and the like may be used.

As the antioxidant, as a radical scavenger, there are phenol type, hydroxylamine type, lactone type and the like, and as the UV absorbing agent, there are triazine type, benzotriazole type, benzophenone type and the like. As the stabilizer, there is a hindered amine light stabilizer. As the release agent, PDMS (polydimethyl siloxanes), polysiloxane polyether copolymers, fluorine-based surface treating agents and the like may be used.

It is preferable that the thickness of the photochromic film according to the present invention is not more than 1 mm.

The photochromic film according to the present invention may be formed by using extrusion molding, casting, blading, and spin coating methods, but it is most preferable that it is produced by using the casting according to the method of the present invention.

The photochromic film according to the present invention is not particularly limited, but may be used for the purpose known in the art. For example, it may be used in glass for construction or vehicles, ski goggles or functional signboards having high durability property.

According to an embodiment of the present invention, the photochromic film according to the present invention may be used with being inserted between two transparent substrates. After the photochromic film according to the present invention is formed, it may be attached to the transparent substrate by using the adhesive layer, it may be directly coated on the transparent substrate to form the photochromic film, or the photochromic composition may be filled between two transparent substrates, and heated and pressed to be inserted between two transparent substrates.

The transparent substrate may be a glass substrate or a plastic substrate, and the glass may be a safety glass or a reinforced glass. FIG. 3 is a sectional view that illustrates an example of products including the photochromic film according to the present invention. The product 10 that is shown in FIG. 3 has a structure in which the photochromic film 13 according to the present invention is inserted between the transparent substrates 11 and 15. FIG. 4 illustrates a sectional view of a product 20 that has a structure in which two transparent substrates 21 and 25 and a photochromic film 23 inserted therebetween are attached to each other by using adhesive layers 22 and 24.

The present invention provides a method for producing a photochromic film, which is capable of providing a film that has a small thickness deviation and small defects on a surface of a film in the case of when the photochromic film is produced in a thickness of not more than 1 mm.

According to an embodiment of the present invention, there is provided a method for producing the photochromic film, which includes the steps of injecting a photochromic composition into a space that is formed from a pair of substrates and a gasket positioned between the pair of substrates, and curing the composition. The shrinkage ratio of the gasket after the composition is subjected to the curing step is not less than 10%. In detail, in the case of when the photochromic film is produced by using a casting method, the photochromic film is cured and produced in a closed state in which an inflow of external air is stopped through a radical polymerization. In the curing step, the shrinkage of the acryl occurs, and in a current process system, the shrinkage of about 10% occurs. In the case of the thin type film that has a thickness of not more than 1 mm, if the shrinkage of acryl as described above is not compensated by the shrinkage ratio of the gasket, wrinkles are formed on the surface of the film. Therefore, by using the gasket that has the shrinkage ratio of not less than 10%, the photochromic film that has the excellent surface state and the thickness of not more than 1 mm may be obtained. However, if the gasket that has the shrinkage ratio of more than 50% is used, by penetrating air bubbles contained in the gasket between acryl molecules in the polymerization, the acryl polymerization may be reduced, and by inflow paths of the bubbles are formed on the surface of the acryl surface, the surface defects may be formed. In addition, the acryl monomer may be lost.

In addition, according to another embodiment of the present invention, there is provided a method for producing the photochromic film, which includes the steps of injecting a photochromic composition into a space that is formed from a pair of substrates and a gasket positioned between the pair of substrates, and curing the composition. The shrinkage ratio of the gasket after the composition is subjected to the curing step is the same as or larger than the shrinkage ratio of the photochromic composition. In detail, when the cured acryl sheet is cured, vacuum pressure occurs in a space while the shrinkage occurs, which is applied to the upper and the lower glass plate as an attractive force. If the shrinkage ratio of the gasket is smaller than the shrinkage ratio of the photochromic composition, since the space between the glass plates is shrunken like a parabola because the vacuum pressure occurs, there are problems in that the thickness of the film is reduced as come closer to the center. Accordingly, in the present invention, by using the gasket that has the shrinkage ratio that is the same as or larger than the shrinkage ratio of the photochromic composition, the photochromic film that has the excellent surface state and the predetermined thickness of not more than 1 mm may be obtained. At this time, the shrinkage ratio of the gasket used is 1 to 10 times as large as that of the photochromic composition.

In the method for producing the photochromic film according to the present invention, the material of the gasket is not particularly limited as long as it is not dissolved in the photochromic composition and has the shrinkage ratio as described above according to the curing. For example, foamed polyethylene, foamed polyvinyl chloride, foamed PDMS (polydimethylsiloxanes), foamed polystyrene, foamed polyurethane and the like may be used. The gasket may have a hollow shape, or may be filled. In addition, its section may be circle, rectangular, or trapezoidal, and it may have a conical shape. Those who are skilled in the art may determine the thickness of the gasket according to the desired thickness of the film, and the size of the gasket may be determined according to the desired size of the film.

In the present invention, the material of the substrate may be used without a limitation as long as it is known in the art. For example, glass, metal, plastic substrates may be used, but the glass is most preferable. In addition, the substrate may have the flat surface, but if necessary have a specific shape on the surface thereof. The preferable thickness of the substrate depends on the size and the kind of the substrate, and when the gasket and the substrate are attached to each other, it should have the thickness enough to prevent the bending of the substrate. For example, in the case of the glass substrate that has the area of 1 m$^2$, it is preferable that the thickness is not less than 5 mm.

If necessary, an adhesive sheet for attaching the gasket and the substrate may be provided between the gasket and the substrate, or a sealing film for sealing the gasket and the substrate may be used.

In the present invention, before the photochromic composition is further injected, a surface release agent is coated on the surfaces of the gasket and the substrate, or the surface release agent may be added to the photochromic composition. As the surface release agent, PDMS (polydimethyl siloxanes), polysiloxane polyether copolymers, fluorine-based surface treating agents and the like may be used.

In the present invention, the condition for curing the photochromic composition is the same as the following description. The curing starts under the normal pressure condition at 25° C. and its temperature is gradually increased for 2~5 hours to 100° C. After it is maintained at 100° C. for 1~3 hours, the temperature is reduced for 2~5 hours to 25° C. to cure the film. However, the scope of the present invention is not limited by the above condition, and a curing condition that is known in the art may be used.

The method according to the present invention may further include separating the substrate and the gasket and separating the acryl film, after the curing step.

According to the method of the present invention, the film that has the size of 20 cm×20 cm may have the thickness of not more than 1 mm, preferably 0.1 to 0.5 mm, and more preferably about 0.3 mm. In addition, the film that is produced according to the present invention has a small thickness deviation. The thickness deviation is different from each other according to the purpose of the film, but the thickness deviation is preferably not more than 30%, and more preferably less than 10%.

MODE FOR INVENTION

Hereinbelow, the present invention will be described in detail with reference to Examples. The present invention may, however, be embodied in many different forms and should not be construed as being limited to the Examples set forth herein. Rather, these Examples are provided to fully convey the concept of the invention to those skilled in the art.

Example 1

The gasket that is made of foamed PVC (polyvinyl chloride) that had the shrinkage of 20% showing the thickness change from 500 to 400 μm while it was cured under the vacuum compression was provided to the edges of two glass plates having the thickness of 3 mm. Next, after the photochromic composition (shrinkage ratio: 17%) that was made of the composition of the following Table 1 was filled between the glass plates, the curing started under the normal pressure condition at 25° C., its temperature was gradually increased for 4 hours to 100° C., it was maintained at 100° C. for 2 hours, and the temperature was reduced for 4 hours to 25° C. After the curing step, the thickness deviation of the film that was separated from the glass substrate and the gasket was within 5%, and the thickness was in the range of 395 to 410 μm. In addition, while the film was discolored, the optical density was less than 20% and the oxygen transmittance was 100 cc/m$^2$·day·atm. The sample was exposed in ATLAS UV 2000, an accelerated weathering tester, by using a UVA fluorescent lamp under a condition of light intensity of 0.77 W/m$^2$ at 340 nm and 60° C. for 8 hours during a cycle in which 4 hour condensation is repeated at 50° C. to measure an optical density and measure the time that is required to increase the transmittance at $\lambda_{min}$ to a half of the transmittance at an early discoloration step. As a result, the time was 1540 hours.

TABLE 1

| Component | Kind of compound | content (weight ratio) |
|---|---|---|
| Monomer | BP4PA (KYOEISHA) | 30.00 |
| | Styrene | 8.00 |
| | Divinyl benzene (DVB) | 20.00 |
| | 9-EGDA (KYOEISHA) | 40.00 |
| | TMPTA (SK Cytech) | 2.00 |
| Polymerization initiator | V-65 (Wacko) | 0.2 |
| Dye | Palatinate Purple of James Robinson, Col., Ltd. | 1.0 |
| Stabilizer | HALS (hindered amine light stabilizer) [Tinuvin 144 (Ciba)] | 2.0 |

Example 2

The film was produced in the same manner as Example 1, except that foamed PE (polyethylene) that had the shrinkage ratio of 25% showing the thickness change from 400 to 300 μm under the vacuum compression in the curing was used as the gasket. After the curing step, the thickness deviation of the film that was separated from the glass substrate and the gasket was within 8%, and the thickness was in the range of 305 to 330 µm. In addition, while the film was discolored, the optical density was less than 20% and the oxygen transmittance was 100 cc/m$^2$·day·atm. The sample was exposed in ATLAS UV 2000, an accelerated weathering tester, by using a UVA lamp under a condition of light intensity of 0.77 W/m$^2$ at 340 nm and 60° C. for 8 hours during a cycle in which 4 hour condensation is repeated at 50° C. to measure an optical density and measure the time that is required to increase the transmittance at $\lambda_{min}$ to a half of the transmittance at an early discoloration step. As a result, the time was 1550 hours.

Example 3

The film was produced in the same manner as Example 1, except that PE (polyethylene) that had the shrinkage ratio of 0.1% showing the thickness change from 300 to 299 µm under the vacuum compression in the curing was used as the gasket. After the curing step, the thickness deviation of the film that was separated from the glass substrate and the gasket was within 56%, and the thickness was in the range of 180 to 350 µm. In addition, while the film was discolored, the optical density was less than 22% and the oxygen transmittance was 100 cc/m$^2$·day·atm. The sample was exposed in ATLAS UV 2000, an accelerated weathering tester, by using a UVA lamp under a condition of light intensity of 0.77 W/m$^2$ at 340 nm and 60° C. for 8 hours during a cycle in which 4 hour condensation is repeated at 50° C. to measure an optical density and measure the time that is required to increase the transmittance at $\lambda_{min}$ to a half of the transmittance at an early discoloration step. As a result, the time was 1400 hours.

Comparative Example

The thermosetting polyurethane resin composition that was made of the component of the following Table 2 was coated on the polycarbonate film to obtain the film on which the photochromic layer was formed, and the oxygen transmittance and the durability of the film were measured. The thickness deviation of the coat of the obtained film was 18%, while it was discolored, the optical density was 31%, and the time that is required to increase the transmittance at $\lambda_{min}$ to a half of the transmittance at an early discoloration step was measured by using the same method as Examples. As a result, the time was 170 hours.

TABLE 2

| Component | Kind of compound | Weight (g) | % by weight |
| --- | --- | --- | --- |
| Polyurethane | Estane 5701 (NOVEON) | 500 | 10.31 |
| Solvent | Cyclohexanone | 2833 | 58.43 |
| | IPA | 1490 | 30.73 |
| Dye | Palatinate Purple of James Robinson, Co., Ltd. | 25.7 | 0.53 |
| Total | | 4848.7 | 100.00 |

According to the present invention, a photochromic film that has excellent transparent property and durability property, a small thickness deviation, small defects on a surface of a film, and a relatively large density may be produced. In addition, according to a method of the present invention, a photochromic film that has a small thickness deviation and small defects on a surface of a film in the case of when the photochromic film is produced in a thickness of not more than 1 mm may be produced.

The invention claimed is:

1. A photochromic film wherein the photochromic film is formed by curing a photochromic composition comprising a multifunctional (metha)acrylate-based monomer that has two or more functional groups and a photochromic dye, and the photochromic film has a thickness of not more than 1 mm and a thickness deviation within 30%.

2. The photochromic film as set forth in claim 1, wherein while discoloration is carried out, the optical density is not more than 35%, the oxygen permeation is not more than 300 cc/m2-dayatm, and a time that is required to increase the transmittance at λ.mjn (a wavelength value at which the transmittance is smallest) to a half of the transmittance at an early discoloration step is not less than 1,000 hr.

3. The photochromic film as set forth in claim 1, wherein the multifunctional (metha)acrylate-based monomer that has two or more functional groups includes one selected from a bisphenol A-based acrylate monomer and polyalkylene glycol-based di(metha)acrylate or a mixture thereof.

4. The photochromic film as set forth in claim 3, wherein the multifunctional (metha)acrylate-based monomer that has two or more functional groups includes BP4PA, EGDA (ethylene glycol diacrylate) and GDMA (ethylene glycol dimethacrylate).

5. The photochromic film as set forth in claim 3, wherein the multifunctional (metha)acrylate-based monomer that has two or more functional groups includes one selected from the group consisting of dipentaerythritol hexaacrylate (DPHA), dipentaerythritol hydroxy pentaacrylate, pentaerythritol tetraacrylate, pentaerythritol triacrylate, trmethylene propyl triacrylate (TMPTA), propoxylated glycerol triacrylate, and trimethylpropane ethoxy triacrylate, or a mixture thereof.

6. The photochromic film as set forth in claim 1, wherein the multifunctional (metha)acrylate-based monomer that has two or more functional groups is included in an amount of not less than 50% by weight in the photochromic composition.

7. The photochromic film as set forth in claim 1, wherein the photochromic composition includes a vinyl-based monomer containing an aromatic cycle in an amount of not more than 30% by weight.

8. The photochromic film as set forth in claim 7, wherein the vinyl-based monomer containing an aromatic cycle includes styrene and divinyl benzene.

9. The photochromic film as set forth in claim 7, wherein the photochromic composition includes a long chain monomer having not less than 15 C—C bonds between double bonds of the functional groups in an amount of not less than 50% by weight on the basis of all of the monomers, and a short chain monomer having less than 15 C—C bonds between double bonds of the functional groups in an amount of less than 50% by weight on the basis of all of the monomers.

10. The photochromic film as set forth in claim 1, wherein the photochromic dye is a spiro-oxazine-based or a naphtopyran-based organic compound.

11. The photochromic film as set forth in claim 1, wherein the photochromic composition further includes one or more additives selected from the group consisting of a polymerization initiator, a stabilizer, a ultraviolet-absorbing agent, an antioxidant, a chain transfer agent, an IR absorbent, an anti foaming agent, an antistatic agent and a surface release agent.

12. The photochromic film as set forth in claim 1, wherein the photochromic film is formed by injecting a photochromic composition into a space that is formed from a pair of substrates and a gasket positioned between the pair of substrates and curing the composition, and the shrinkage ratio of the gasket after the composition is subjected to the curing is not less than 10%.

13. The photochromic film as set forth in claim 1, wherein the photochromic film is formed by injecting the photochromic composition into a space that is formed from a pair of substrates and a gasket positioned between the pair of substrates and curing the composition, and the shrinkage ratio of the gasket after the composition is subjected to the curing step is the same as or larger than the shrinkage ratio of the photochromic composition.

14. A transparent product comprising a transparent substrate and the photochromic film according to claim 1 on at least one side of the transparent substrate.

15. The transparent product as set forth in claim 14, wherein the transparent product has a structure in which the photochromic film is inserted between two transparent substrates.

16. The transparent product as set forth in claim 15, wherein an adhesive layer is provided between the transparent substrate and the photochromic film.

17. The transparent product as set forth in claim 14, wherein the transparent product is glass for construction or vehicles, ski goggles or functional signboards having high durability property.

18. A method for producing a photochromic film, comprising the steps of injecting a photochromic composition comprising a multifunctional (metha)acrylate-based monomer that has two or more functional groups and a photochromic dye into a space that is formed from a pair of substrates and a gasket positioned between the pair of substrates; and curing the composition, wherein the shrinkage ratio of the gasket after the composition is subjected to the curing step is not less than 10%.

19. A method for producing a photochromic film, comprising the steps of injecting a photochromic composition comprising a multifunctional (metha)acrylate-based monomer that has two or more functional groups and a photochromic dye into a space that is formed from a pair of substrates and a gasket positioned between the pair of substrates; and curing the composition, wherein the shrinkage ratio of the gasket after the composition is subjected to the curing step is the same as or larger than the shrinkage ratio of the photochromic composition.

* * * * *